Sept. 4, 1923. 1,466,870
W. S. BAIRD
SNAPPING MECHANISM FOR CORN HARVESTING MACHINES
Filed March 23, 1918 2 Sheets-Sheet 1
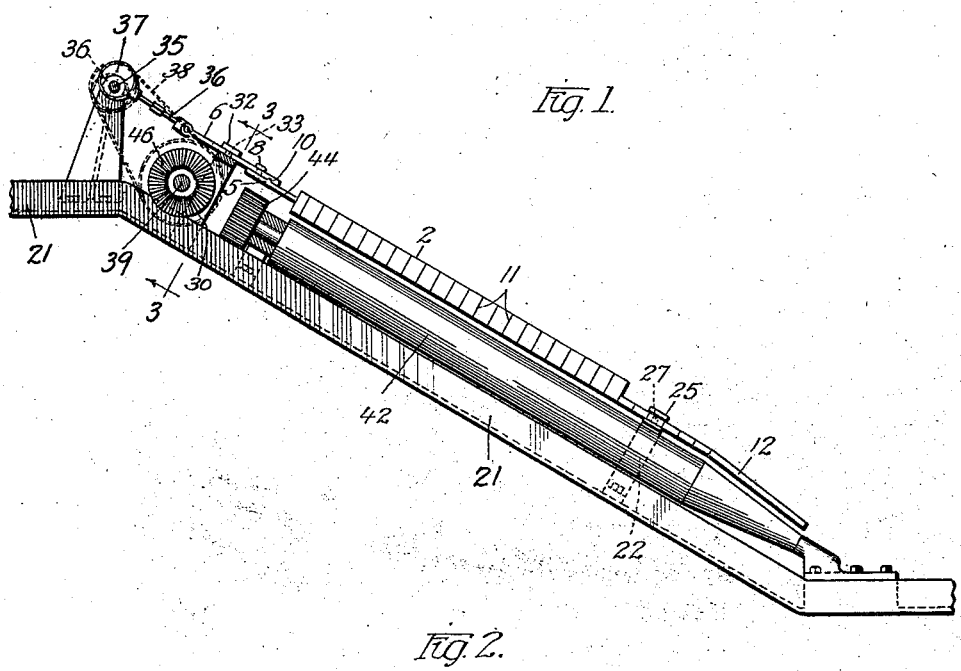
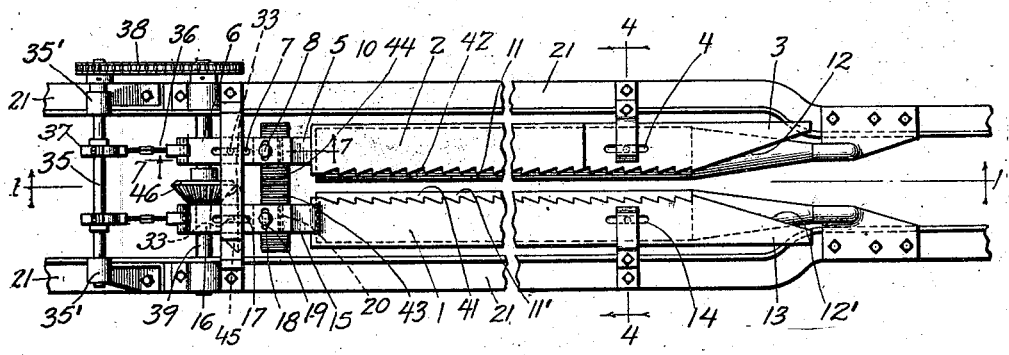

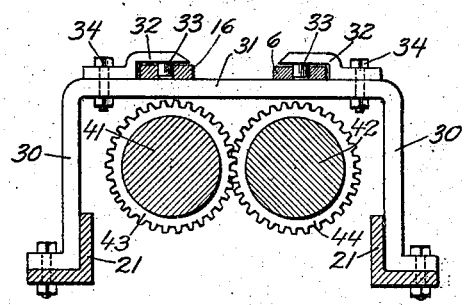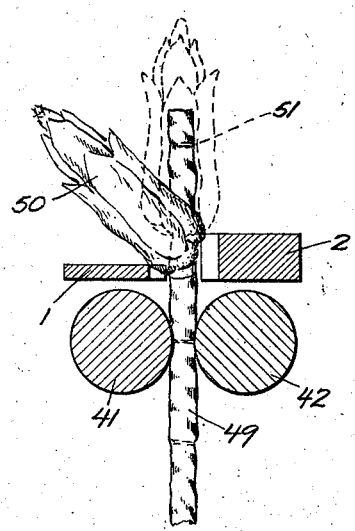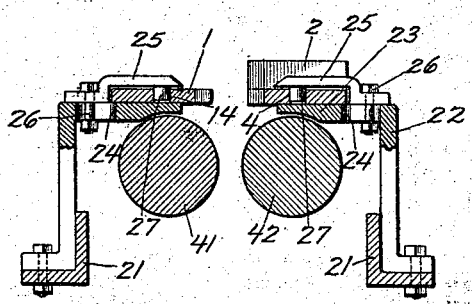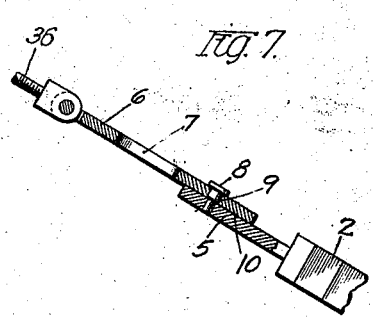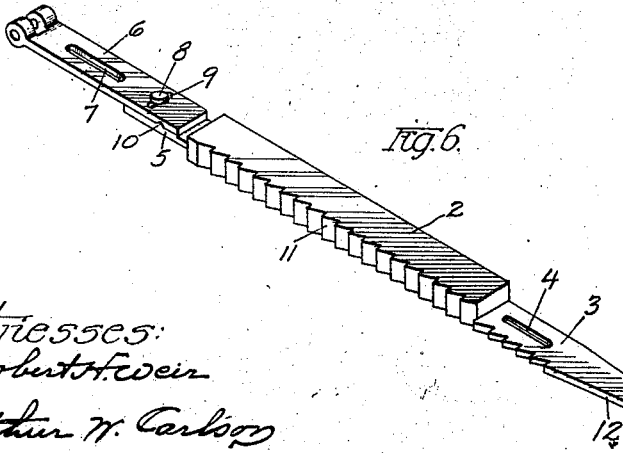

Patented Sept. 4, 1923.

1,466,870

UNITED STATES PATENT OFFICE.

WILLIAM SEWARD BAIRD, OF DECATUR, ILLINOIS.

SNAPPING MECHANISM FOR CORN-HARVESTING MACHINES.

Application filed March 23, 1918. Serial No. 224,180.

*To all whom it may concern:*

Be it known that I, WILLIAM SEWARD BAIRD, a citizen of the United States, residing at Decatur, in the county of Macon and State of Illinois, have invented certain new and useful Improvements in Snapping Mechanism for Corn-Harvesting Machines, of which the following is a description.

My invention belongs to that general class of devices known as corn harvesting machines and relates particularly to means forming a part of the machine and adapted to automatically and efficiently remove the ears from the stalks of the standing corn. My invention has among its objects the production of a device of the kind described that is simple, efficient and satisfactory for use wherever found applicable. It has also as an object the production of a device that will not to any appreciable extent shell the kernels from the cob. More particularly it has as an object the production of a snapping mechanism in which as the stalk of corn is drawn down between the bars by the snapping rolls, the ear of corn on the stalk will follow the stalk until one side of the ear comes in contact with one bar, and as the stalk continues to be drawn down by the snapping rolls, the ear is forced over to one side at an angle so that the same is easily snapped off. The invention is in the nature of an improvement over the snapping mechanism shown and described in my prior Patent Number 1,035,518, dated August 13, 1912.

To this end my invention consists in the novel construction, arrangement and combination of parts herein shown and described, and more particularly pointed out in the claims.

In the drawings, wherein like reference characters indicate like or corresponding parts.

Fig. 1 is a sectional view taken substantially on line 1—1 of Fig. 2;

Fig. 2 is a plan view of a portion of a corn harvesting machine embodying my invention with the remainder of the machine omitted to avoid confusion;

Fig. 3 is a sectional view taken substantially on line 3—3 of Fig. 1;

Fig. 4 is a sectional view taken substantially on line 4—4 of Fig. 2;

Fig. 5 is a sectional view of a portion of the mechanism illustrating the operation;

Fig. 6 is a perspective view of one of the snapping bars; and

Fig. 7 is a sectional view taken substantially on line 7—7 of Fig. 2.

In the preferred form of device shown in the drawings, 1 and 2 represent the snapping bars arranged to cooperate with the snapping rolls hereafter described. The two bars are very similar except that the face of one is above the face of the other, for a portion of its length. Referring to Fig. 6, the bar 2, which may be termed the upper bar or the one having its upper face above the other, is formed with an end 3, and preferably with a slot 4 at said end. At the opposite end of the bar 2 is provided the extending part 5, to which is secured an extending part 6, the same being slotted as at 7 and secured on the part 5 by a bolt or screw 8. The part 5 is transversely adjustable relative part 6, one of the parts, as shown 6, having a transverse slot 9 therein, the screw or bolt 8 engaging the other part. One part, as shown part 5, is formed with a bead or lug 10 arranged to seat in a co-operating recess on the other part. When so constructed the parts may be adjusted transversely, but owing to the lugs 10 there is no tendency for pivotal movement, where only one bolt 8 is employed. The bar 2 is shown provided with teeth or serrations 11 which extend into the part 3, which is beveled at the end on the inner edge at 12.

The bar 1, which may be termed the lower or cooperating bar, is very similar, the same being formed with the serrations 11' and beveled end 12'. This part is provided with a slot 14 and with the end 16 corresponding with the part 6 of the other bar, the same being secured in place by the bolt 18 passing through the slot 19, 20 being a bead or lug corresponding with the lug 10 previously described. The part 16 may be provided with a slot 17 corresponding with slot 7. By making one bar thicker than the other for a portion of its length the face of one is above the other, it being obvious, however, that any equivalent construction might be employed that would produce the same result.

The bars 1 and 2 are preferably slidably supported adjacent each end so that they may be reciprocated when the machine is in operation, as will be hereafter described. The machine is shown provided with the frame parts 21—21, or their equivalents, of the desired size and shape. Carried by parts 21—21 at the forward end of the snapping bars 1 and 2 are brackets 22, the same extended inwardly as at 23 over the snapping rolls 41 and 42. The snapping bars may be secured on their supports 23 in any suitable manner. As shown, I provide brackets 25 for this purpose, which are secured to the extended parts 23 by bolts 26, the brackets having lugs or pins 27, or the equivalents, arranged to extend through the slots 4 and 14 of the two bars. Referring to Fig. 4, it will be noted that I slot the extending parts 23 at 24 so that the brackets may be adjusted so as to vary the adjustment of or space between the two snapping bars. I preferably support the rear end of the snapping bars by a bracket consisting of the cross part 31 having legs 30 secured to the frame part 21. Carried by the extending part 31, are brackets 32 having lugs 33 arranged to engage in the slots 7 and 17 of the extending ends 6 and 16. The brackets 32 are secured in place by bolts 34 or their equivalents for the purpose. In this case the upper ends of the bars may be adjusted by making the adjustment between the parts 5 and 6, and 15 and 16.

Any suitable means may be provided for reciprocating the bars. As shown, a shaft 35 is carried by the brackets 35', this shaft being provided with eccentrics 37. A rod 36 is provided for each bar, the same having an eccentric strap at one end arranged to cooperate with the eccentric 37, is secured at its opposite end to the bar 6 or 16. I have shown the two part rod 36 connected by a turnbuckle or nut, so that the length of the rod may be varied for the purpose of adjustment. Shaft 35 may be driven in any suitable manner. As shown, it is connected by a belt or chain 38 or the equivalent, and suitable pulleys or sprockets to a shaft 39, which is arranged to drive the snapping rolls 41 and 42, which are provided with gears 43 and 44 driven by suitable shafting connected with the gearing 45 and 46. This particular mechanism, however, forms no part of the present invention and need not be described further in detail.

As the harvesting machine carrying the snapping mechanism herein described travels along the row, it being understood that the bars 1 and 2 are reciprocated back and forth and the snapping rolls 41 and 42 driven, the stalks 49 carrying the ears will enter between the bars 1 and 2 as shown in Fig. 5, in which 50 represents the ear carried by the stalk and the upper part of the stalk above the bars. As the stalks are turned down by the rolls 41 and 42 the ears will engage with the bar 2 and be canted, tipped or bent over, and at the same time the snapping bars will tend to twist the ear so that the ear is thereby wrenched and broken from the stalk. The device operates most efficiently for snapping the ears from the stalk, as the canting or tipping of the ear at an angle as shown causes the ear to be easily snapped. In the dotted lines in Fig. 5 the ear is shown before being tipped and snapped, while the full lines show the ear about to be snapped off. After the ears have been snapped off they may of course be carried away in any desired manner.

Having thus described my invention, it is obvious that various immaterial modifications may be made in the same without departing from the spirit of my invention, hence I do not wish to be understood as limiting myself to the exact form, construction, arrangement and combination of parts herein shown and described or uses mentioned.

What I claim as new and desire to secure by Letters Patent is:—

1. In a device of the kind described and in combination, a pair of snapping rolls and means arranged thereabove for simultaneously tilting and twisting the ears transversely on the stalks while the latter are engaged by said rolls.

2. In a device of the kind described and in combination, means adapted to engage the stalks, ear engaging means comprising a pair of spaced bars, one of said bars having a reciprocating motion longitudinally of said stalk engaging means and formed to engage the ears at a vertically higher point than the other one.

3. In a device of the kind described and in combination, means adapted to engage the stalks, ear engaging means comprising a pair of spaced bars, one of said bars having a reciprocating motion longitudinally of said stalk engaging means and formed to engage the ears at a vertically higher point than the other one, and means for adjustably supporting said bars.

4. In a device of the kind described and in combination, snapping bars consisting of two cooperating bars arranged to engage the ear, one bar arranged to engage the ear at a horizontal plane above the other bar, whereby the ear is tilted at an angle to the stalk, and means for reciprocating one of said bars parallel to the ear engaging edge of the other bar.

5. In a snapping device of the kind described and in combination, a pair of longitudinally movable bars arranged substantially parallel to each other with a space therebetween, said bars formed with a series of teeth on their adjacent edges, the engaging face of one bar disposed in a horizontal plane above the other bar, and means for reciprocating said bars.

6. In a snapping device of the kind described and in combination, a pair of longitudinally movable bars arranged substantially parallel to each other with a space therebetween, the rear ends of said bars transversely adjustable relative to the remainder of the bars, said bars formed with a series of teeth on their adjacent edges, the engaging face of one bar disposed in a horizontal plane above the other bar, and means for reciprocating said bars.

7. In a device of the kind described and in combination, a pair of rolls, a pair of bars arranged substantially parallel to and above said rolls, said bars arranged to cooperate with said rolls and remove the ears from the stalks, said bars provided with a plurality of substantially evenly spaced rearwardly directed teeth upon the proximate edges, one bar arranged to engage the ears at a horizontal plane slightly above the other bar, whereby the ear is tipped into engagement with said other bar, and means for reciprocating one of said bars.

8. In a device of the kind described and in combination, a pair of engaging rolls, a pair of bars arranged substantially parallel to and above said rolls, means for adjustably supporting said bars, said bars arranged to cooperate with said rolls and remove the ears from the stalks, said bars provided with a plurality of substantially evenly spaced rearwardly directed teeth upon the proximate edges, one bar arranged to engage the ears at an elevation slightly above the other bar, whereby the ear is tipped into engagement with said other bar, and means for reciprocating one of said bars including a rotatable shaft, and adjustable means for operatively connecting said shaft and bars.

In testimony whereof, I have hereunto signed my name in the presence of two subscribing witnesses.

WILLIAM SEWARD BAIRD.

Witnesses:
  Roy W. Hill,
  Charles I. Cobb.

Certificate of Correction.

It is hereby certified that Letters Patent No. 1,466,870, granted September 4, 1923, upon the application of William Seward Baird, of Decatur, Illinois, for an improvement in "Snapping Mechanism for Corn-Harvesting Machines," were erroneously issued to the inventor, said Baird, whereas said Letters Patent should have been issued to *Baird Corn Husker Co., of Champaign, Illinois, a Corporation of South Dakota*, said corporation being assignee of the entire interest in said invention, as shown by the records of assignments in this office; and that the said Letters Patent should be read with this correction therein that the same may conform to the record of the case in the Patent Office.

Signed and sealed this 9th day of October, A. D., 1923.

[SEAL.]
WM. A. KINNAN,
*Acting Commissioner of Patents.*